March 27, 1956 W. J. CARLYLE 2,739,377
ARTICLE FORMING METHOD AND APPARATUS
Original Filed March 23, 1948 2 Sheets-Sheet 1
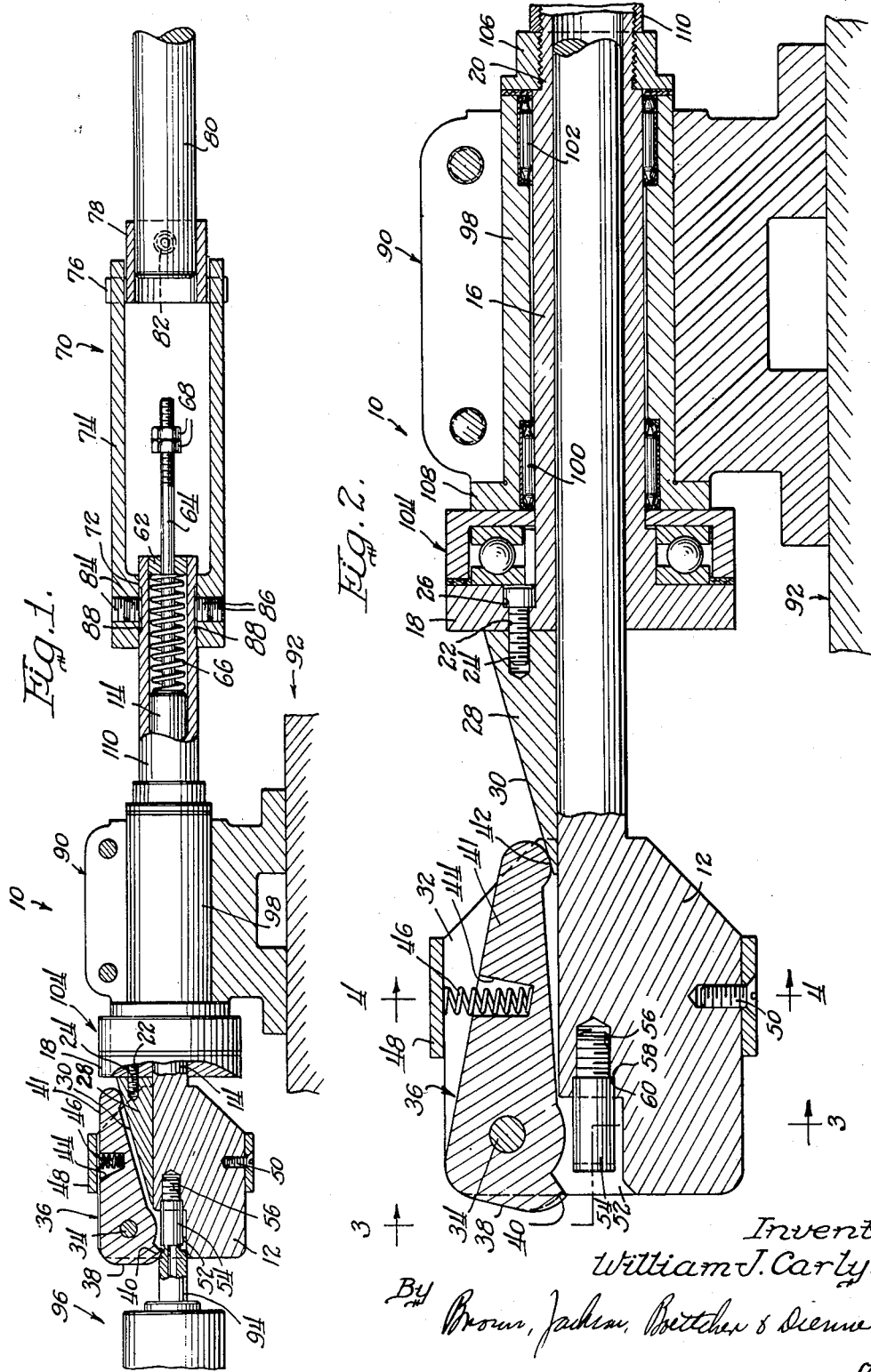
Inventor:
William J. Carlyle.
By Brown, Jackson, Boettcher & Dienner
Attys March 27, 1956 W. J. CARLYLE 2,739,377
ARTICLE FORMING METHOD AND APPARATUS
Original Filed March 23, 1948 2 Sheets-Sheet 2
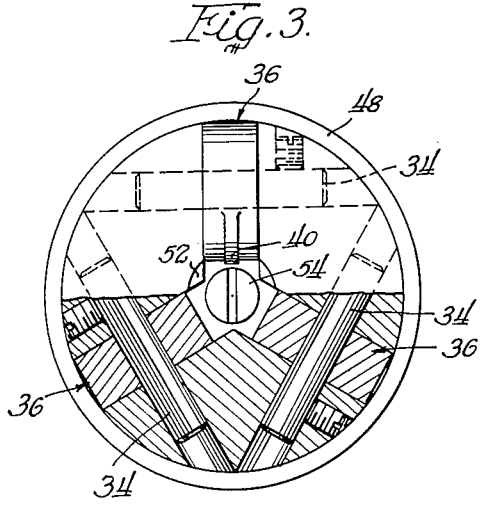
Fig. 3.
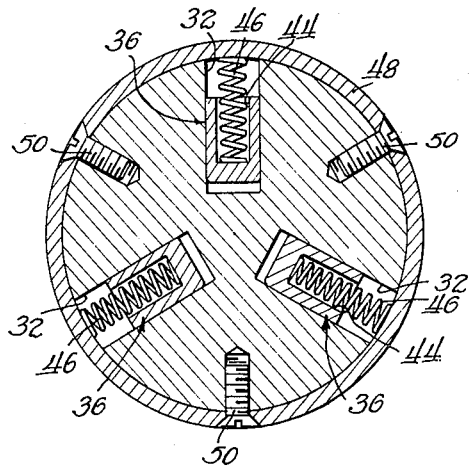
Fig. 4.
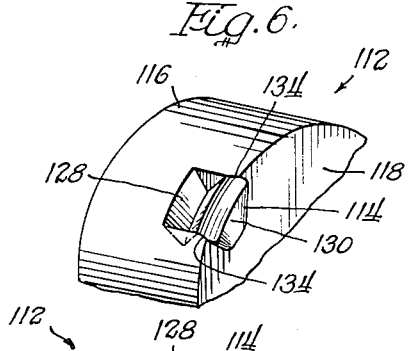
Fig. 6.
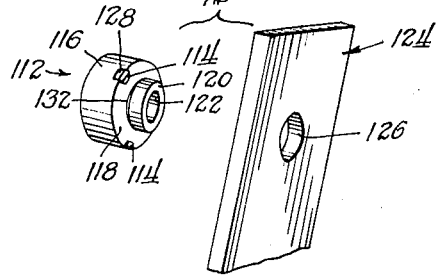
Fig. 5.
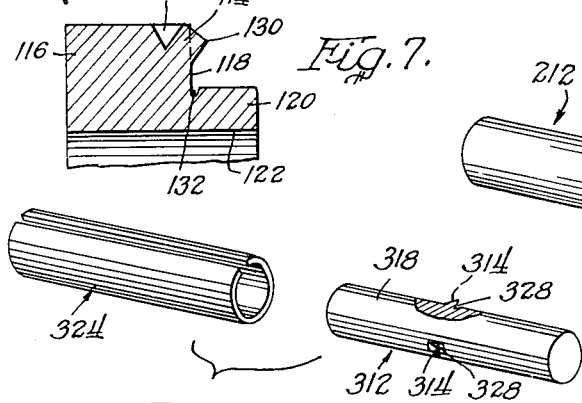
Fig. 7.
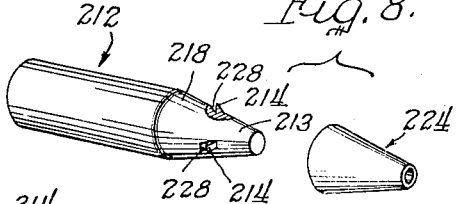
Fig. 8.
Fig. 9
Inventor:
William J. Carlyle.
BY Brown, Jackson, Boettcher & Dienner
Attys.

United States Patent Office 2,739,377
Patented Mar. 27, 1956

2,739,377

ARTICLE FORMING METHOD AND APPARATUS

William J. Carlyle, Barrington, Ill., assignor, by direct and mesne assignments, to Richard J. D. Heilshorn, Chicago, Ill.

Original application March 23, 1948, Serial No. 16,462. Divided and this application November 14, 1951, Serial No. 256,198

7 Claims. (Cl. 29—555)

The present invention relates to a method and apparatus for forming articles of manufacture, and is particularly directed to a method and apparatus for forming the articles disclosed in my copending application, Serial No. 16,462, filed March 23, 1948, of which the present application is a division.

The articles disclosed in my copending application are adapted to be resistance-welded to other objects.

In resistance-welding operations wherein the objects to be welded are held in contact under pressure and are each electrically associated with one of the electrodes of the welding machine, it is necessary that the area of contact between the objects be sufficiently limited that, for the voltage impressed, high resistance be set up to provide rapid melting of the contacting areas. It is an important object of my invention to provide a method and means for producing on that surface of the article which is to be resistance-welded to another object one or more projections so that the article may be easily, speedily and strongly joined to the object.

When the articles to be joined have complementary surfaces which are required to be flush after welding, or when the welded components are to be of a specific thickness when joined, the advantages of the method of the present invention become increasingly evident. For example, according to presently practiced art, welding projections are formed on a surface of one article, the article of heavier section, in such manner that the projections taper outwardly from a relatively large area at the base to a considerably smaller area at the crest. A sheet metal article may then be secured to the one article by resistance welding. Formation of the welding projections in the manner stated results in many disadvantages, among which is the inability to select a welding current high enough to melt the base of the projection without effecting expulsion of the crest thereof. A current high enough to melt the large base will effect expulsion of the small crest of the projection so that metal becomes lodged between non-welding surfaces of the articles to space the members apart and prevent the desired flush finished assembly. A current low enough to prevent expulsion will not melt the base, so that the base will not accommodate relative set down of the articles and will space the two articles apart. A further disadvantage of the present art is the quenching or cooling effect of the article of heavier section due to its large area of engagement with the projections.

It is an object of the present invention to overcome the disadvantages of present day practice by providing a method and means for forming an article with entirely uniform projections, the projections being pulled out of the material of the article to reduce and substantially eliminate any quenching action.

Another object of my invention is to provide a method and apparatus for raising uniform projections from an article and forming a cavity adjacent each projection, the cavities formed being then available to take up excess metal which may recede during welding. By raising the projections from out of the body of the article, where the metal is not required, less metal is used than if the projections were formed from additional metal and the cavities formed by so raising the projections reduce and prevent any undesirable quenching action. By the improved mechanism and method of my invention articles of many sizes and shapes may be inexpensively formed for welding operations of great variety.

A further advantage of the method and mechanism of this invention is that they may be employed in producing the article on screw machines, the article being formed from bar stock or from individual pieces of material.

Another object of the invention is to provide a method and apparatus for forming screw machine products adapted to be resistance-welded to metal elements, wherein the article produced is precision formed with projecting areas of small cross-section for accurate and rapid securement to elements in such manner that the article retains its precision formation after welding and that the assembled product has a precision consistent with that of the formation of the article.

Other objects, uses and advantages will be obvious or become apparent from a consideration of the following description and drawings in which:

Figure 1 is a central, longitudinal, sectional view of the mechanism which is adapted to form articles for resistance-welding operations, certain portions of the structure being shown in elevation;

Figure 2 is an enlarged fragmentary view of the mechanism of Figure 1, showing the projection-raising elements in retracted position;

Figure 3 is an end view on the line 3—3 of Figure 2;

Figure 4 is a sectional view on the line 4—4 of Figure 2;

Figure 5 shows an article formed according to my invention and an object to which it is adapted to be welded;

Figure 6 is an enlarged fragmentary view of the article of Figure 5;

Figure 7 is an enlarged, fragmentary, sectional view of the article of Figure 5;

Figure 8 shows another article formed according to my invention and an object to which it is adapted to be welded; and Figure 9 shows yet another article formed according to my invention and an object to which it is adapted to be welded.

Referring now to Figures 1 through 4 of the drawings I shall give a description of the tool and other mechanism which are employed to produce an article such as that illustrated in Figure 5 of the drawings. The tool which is indicated generally by the reference numeral 10 comprises a head 12 which has a longitudinally extending shaft 14, said shaft being carried in a tubular driving shaft 16. Shaft 14 is adapted to find support in shaft 16 during reciprocal movement of the shaft 14 along its longitudinal axis. Shaft 14 and the head 12 are adapted to rotate about the longitudinal axis of said shaft, together with the tubular shaft 16 in a manner to be described below.

Tubular driving shaft 16 has a flange 18 at that end which is adjacent the head 12 and, at its opposite end, shaft 16 has a reduced end 20 which is threaded (see Figure 2). Three bores, such as the bore 22, are formed in the flange 18 of shaft 16 and are adapted to receive screws 24, the heads of which seat within the enlarged ends 26 of the bores 22. Secured to the flange 18 are three wedge-shaped members or cam elements 28 having surfaces 30. Each cam element 28 is secured to the flange 18 of shaft 16 by a screw 24.

In the head 12 there are three equally spaced apart slots 32 of such dimensions as to permit the cam elements 28 to have a sliding fit therein. At the forward end of each slot 32 in the head 12 is a pivot pin 34 on which pivot pin is mounted a movable lever, indicated generally by the reference numeral 36, having an arm 38 and an arm 41. Adjacent the end of lever arm 38 of lever 36 there is a projection-raising tooth 40. At the end of lever arm 41 of the lever 36, and more distant from the pivot pin 34 than the tooth 40, there is a bearing surface 42 which is adapted to ride on the cam surface 30 of the associated cam element 28. Each lever arm 41 contains a well 44 which is elongated in the direction of the front end of the head 12, that is, towards the left end of the tool 10, as viewed in Figures 1 and 2. Each well is adapted to receive a resilient element, such as the compression spring 46, and an encircling band or strap 48 secured to head 12 by screws 50 forms an abutment or reaction member for the upper end of each of the springs 46. It will be apparent, therefore, that the springs 46 tend to rotate the lever arms 38 and 41 clockwise about the respective pivot points 34. This tends to cause the arms 38 to rotate their respective toothed elements 40 in a direction away from the central longitudinal axis of the head 12 and shaft 14 and away from the socket 52, which socket extends inwardly of the free end of head 12 and is defined in part by the head and in part by the three surrounding lever arms 38. A stop member 54 is threaded into a socket 56 of reduced diameter which extends farther inwardly of the head 12 and connects with socket 52. The stop member is interchangeable with other stop members of different lengths and diameters. Stop member 54 has a shoulder 58 adapted to seat against the shoulder 60 which is formed at the end of the threaded socket 56.

Referring more particularly to Figure 1, it will be seen that an apertured guide member or plug 62 is secured, as by welding, within the end of tubular driving shaft 16. A rod 64 passes through the aperture in guide 62 and is connected with that end of shaft 14 which is opposite from the head 12. A compression spring 66, carried within the tubular driving shaft 16 and about the rod 64, is interposed between the end of shaft 14 and the guide member 62 so that the spring tends to push the shaft 14 and its head 12 to the left, as viewed in Figures 1 and 2, an away from the flanged end 18 of the tubular driving shaft 16. Rod 64 is threaded at its free end and a pair of nuts 68 are threaded thereon to serve to limit movement of the shaft 14 and head 12 to the left within the tubular driving shaft 16.

Various means may be employed for driving the tubular driving shaft 16. It is only necessary that the driving means associated with shaft 16 provide clearance for movement of the rod 64 which is connected to the reciprocating shaft 14 of head 12. One form of driving means is that shown in Figure 1 wherein the driving means 70 comprises a dog 72 having a pair of spaced apart arms 74, which arms have a sliding fit within notches 76 in the flange of collar 78. The collar in turn is connected with a driving shaft 80 by a threaded member 82 which interconnects collar 78 and shaft 80. Dog 72 is adapted to be connected to the tubular extension 110 by pairs of set screws 84 and 86 which are carried in the dog and seat against flats or surfaces 88 on the tubular extension 110. Extension 110 in turn is attached to driving shaft 16 at its threaded end 20, the extension locking against threaded collar 106.

When the tubular driving shaft 16 is driven from a source of power (not shown) through the shaft 80, dog 72 and tubular extension 110, the cam elements 28 engage the side walls of the slots 32 in head 12 and thereby cause the head 12 and its shaft 14 to be rotated. Such driving connection exists regardless of where the head 12 and shaft 14 may be positioned with respect to the tubular driving shaft 16. This will be apparent from a consideration of Figures 1 and 2. Figure 1 shows the head 12 positioned closely adjacent the tubular driving shaft 16 with the lever arms 38 of levers 36 having their toothed elements 40 in projection-raising position while Figure 2 illustrates the lever arms 38 in their retracted position with the toothed elements 40 withdrawn from the socket 52.

The tool 10 is supported in a bracket, indicated generally by the reference numeral 90, which may be positioned on a carrier 92. Carrier 92 may be fixed or movable, but in the illustrated form of the invention it is reciprocable along an axis parallel to the longitudinal axis of head 12 and shaft 14. This permits the head to be moved into engagement with the free end of a piece of material 94 (see Figure 1) which is held in a chuck, indicated generally by the reference numeral 96, said chuck being fixed against longitudinal movement but being adapted to rotate the material, or bar stock 94.

Bracket 90 is adapted to secure a bearing sleeve 98 which supports and interposes a pair of bearing races 100 and 102 between itself and the tubular driving shaft 16. Bearing sleeve 98 is maintained in position on tubular driving shaft 16 between a thrust bearing, indicated generally by the reference numeral 104, and a collar 106 which is threaded on to the reduced threaded end 20 of shaft 16. Thrust bearing 104 is disposed between the flanged end 18 of driving shaft 16 and the flange 108 of the bearing sleeve 98. The tubular extension 110 of the tubular driving shaft 16 is connected to said shaft behind the collar 106 by threaded engagement with the reduced threaded end 20 of tubular driving shaft 16.

If reference will now be made to Figures 5 and 6, there will be seen an article, indicated generally by the reference numeral 112, which has been formed with three projections 114 equally spaced about the body portion 116 of the article and extending outwardly from the surface of the shoulder 118 which is located between the body portion 116 and its integral shank 120. A passageway, such as the bore 122, may be formed along the longitudinal axis of the article 112 in order to provide a hub for a plate, such as the plate indicated by reference numeral 124, which has an aperture 126 in which the shank 120 of the article 112 is adapted to be fitted.

If reference will be made to Figure 6 it will be seen that each projection 114 has been raised from the body 116 of the article by a sharp instrument, such as one of the toothed elements of the tool 10. The formation of the projection 114 simultaneously results in the formation of a cavity 128 longitudinally adjacent each projection 114. It will be noted that each cavity and its projection are in line with the direction in which pressure will be exerted by the resistance welding machine when the article 112 is being welded to an object such as apertured plate 124. Consequently, when the welding operation takes place and the projection 114 is melted, any portion of said projection which becomes fluid may be pressed back into the cavity 128 so that the plate 124 and shoulder 118 of article 112 will become welded with their adjoining surfaces flush, instead of spaced apart by any excess metal resulting from the projections. Each cavity 128, therefore, supplies a relief area. Each projection 114 is formed with a sharp edge 130 which will give either a point or line contact of very limited contact area with the surface of plate 124 prior to welding. The limited contact results in high resistance to the flow of electricity with the result that the projections are rapidly melted so that the welding operation may be quickly performed. Each projection is of uniform dimension throughout its length so that a current sufficient to melt the crest will melt the base of the projection to prevent occurrence of the disadvantages of prior methods pointed out hereinbefore. The cavities each assist in defining limited engagement between each projection and the body of the article to reduce and eliminate any quenching action. Furthermore, due to the absence of extraneous factors, the two articles can readily be designed for heat balance therebetween.

It will be observed from Figures 5 and 7 that a relief groove 132 is provided in the article 112 so that molten metal formed from the projections 114 during the welding operation may also run into said groove 132. This not only assists in permitting a flush weld between the shoulder 118 and the surface of plate 124 but also helps to join the shank 120 to the inner wall of aperture 126 in the plate 124. The inclined surfaces of the projections 114 tend to direct the molten metal toward the groove 132. Although the groove 132 is preferably placed as shown in Figure 7, it could be formed in the face of shoulder 118, instead of in the shank 120, or could be formed in both the shoulder and shank.

Referring again to Figure 6, it is possible in forming the projections 114 to cause cleavage lines as indicated at 134 so that side walls of the projection 114 are fractured or separated from the body 116 of the article 112 thus providing even a more limited path for the flow of electricity during the resistance-welding operation. Such cleavages promote the more rapid welding of the projections 114. Then, during the welding operation, the cleavages or fractures are welded together so that the metal constituting the projections once again is strongly united to the body of the material.

Referring now to Figure 8 there will be seen an article 212 having a tapered end 213 from the surface 218 of which are raised a plurality of projections 214. During the formation of the projections 214 cavities 228 are formed immediately adjacent to the projections. As in the case of the projections 114 and cavities 128 of the article 112, of Figure 5, projections 214 and cavity 228 are alined in the direction in which pressure will be applied during the welding operation so that the cavities may form a relief area into which excessive portions of the projections 214 may be pressed in order to provide a flush weld between the surface 218 and the inner surface of a hollow conical article such as that indicated generally by the reference numeral 224.

Referring to Figure 9 there will be seen an article 312 which is adapted to be secured in a split tube 324 by a resistance welding operation. On the peripheral surface of article 312 are raised a plurality of projections 314 which are formed from the body of the article 312. In the formation of the projections 314 cavities 328 are formed in the body of the article adjacent the projections 314. It will be observed that each projection and its cavity are alined substantially in the direction in which pressure will be applied during the welding operation. This permits the cavity to act as a relief area into which fluid or molten metal may be pressed during the welding operation so that a flush weld may be formed between the surface 318 of the article 312 and the inner surface of the split tube 324.

It will be readily understood that changing the shape of the projection-raising elements, or teeth, 40 of arms 36 will permit variations in the shape of the projections 114 and adjacent cavities 128 of articles 112. The depth of the cavities and height of the projections may also be varied by varying the distance between the pivot pins and toothed elements of lever arms 38, or the distance between the pivot pins and the bearing surfaces 42 of lever arms 41. Also, such variations may be provided by changing the angle of inclination of the surfaces 30 of the cam elements 28.

It will be appreciated that the articles illustrated and described are merely by way of example, and that a variety of articles may be formed by my method and mechanism for use in resistance-welding operations. It is not necessary that the article be formed of bar stock since it may also be formed of tubular stock and stock having cross-sections of regular or irregular outline. For the purpose of the application and claims, the foregoing varieties of stock, and others similar thereto, from which articles may be formed, are designated as stock having a longitudinally extending axis.

The foregoing description and the drawings are given merely to explain and illustrate my invention, and the manner in which it may be performed, and the invention is not to be limited thereto, except in so far as the appended claims are so limited since those skilled in the art who have my disclosure before them will be enabled to make modifications and variations therein without departing from the scope of the invention.

I claim:

1. In a forming tool, in combination, a head, means for supporting the head for rotational and longitudinal movement, a plurality of movable arms pivoted on said head, driving means for rotating the head, said driving means including cam elements adapted drivingly to engage said head to rotate it and adapted to engage the arms to cause pivotal movement thereof.

2. In a forming tool, in combination, a head, said head being adapted to rotate about and be movable along its longitudinal axis, a plurality of movable arms pivoted on said head, driving means for rotating the head, said driving means serving as a bearing for longitudinal movement of the head and said driving means including cam elements adapted drivingly to engage said head to rotate it and adapted to engage the arms to cause pivotal movements thereof.

3. A tool adapted to perform forming operations on rotating bar stock, said tool comprising, in combination, a rotatable shaft having an enlarged head at one end, a centrally disposed socket extending inwardly from the end of said head and adapted to receive br stock therein, longitudinally extending slots formed in said head, a lever pivoted in each slot and having a toothed element at one end adapted to move into and out of said socket, driving means for rotating said head, said means being adapted to be fixed against longitudinal movement and including a tubular shaft surrounding the first-mentioned shaft and carrying cam elements at that end of the tubular shaft which is adjacent said head, each of said cam elements extending into one of the slots in said head and thereby being adapted to have driving connection with said head to rotate the same, the other end of each lever being adapted to ride on one of said cam elements, means biasing said head away from the adjacent end of said tubular shaft whereby the ends of the levers having the toothed elements are adapted to be moved outwardly from said socket, bearing means for said rotatable driving means, interchangeable stop means in said socket for governing the extent of stock entry into said socket, adjustable limiting means for said biasing means, a retaining ring encircling said head and said other ends of said levers, and resilient means disposed in an elongated well in each of said arms, said resilient means being adapted to react between said retaining ring and levers whereby the said other ends of said levers are maintained in contact with their respective cam elements.

4. A tool adapted to perform forming operations on rotating bar stock, said tool comprising, in combination, a rotatable shaft having an enlarged head at one end which is rotatable with said shaft, a centrally disposed socket extending inwardly from the other end of said head and adapted to receive bar stock therein, longitudinally extending slots formed in said head, a lever pivoted in each slot and having a toothed element at one end adapted to move into and out of said socket, driving means for rotating said shaft and its head, said driving means including cam elements which extend into the slots in said head and thereby have driving connection with said head to rotate the same, the other end of each lever being adapted to ride on one of said cam elements and to be actuated thereby, resilient means urging the said other ends of said levers into contact with their respective cam elements, and means biasing said cam elements in a direction outwardly of said slot, whereby the ends of the levers having the toothed elements are adapted to be moved outwardly from said socket.

5. A method of forming from longitudinally extending stock an article which is adapted to be electric resistance projection welded to the surface of an object which has an aperture therein, which method comprises rotating the stock about its longitudinal axis, forming on the free end of the rotating stock a shank of reduced diameter which corresponds to the diameter of the aperture, forming a shoulder at an angle with respect to said shank to provide a surface complementary to that of the surface around the aperture of said object, and pulling at least one welding projection out from the body of the article and forwardly from said shoulder adjacent its periphery.

6. A method of forming from longitudinally extending stock an article which is adapted to be electric resistance projection welded to the surface of an object which has an aperture therein, which method comprises rotating the stock about its longitudinal axis; forming on the free end of the rotating stock a shank of reduced diameter which corresponds to the diameter of the aperture, the shank being adapted to be located in the aperture of the object for locating the article in two directions with respect to said object; forming a shoulder at any angle with respect to said shank to provide a surface complementary to that of the surface around the aperture of said object, said shoulder being adapted to locate the article in a third direction with respect to said object; pulling, during rotation, at least one welding projection out from the body of the article and forwardly from said shoulder adjacent its periphery, and thereby simultaneously forming behind said projection a cavity having a volume corresponding to that of the projection.

7. A method of forming from longitudinally extending stock an article which is adapted to be electric resistance projection welded to the surface of an object which has an aperture therein, which method comprises rotating the stock about its longitudinal axis; forming on the free end of the rotating stock a shank of reduced diameter which corresponds to the diameter of the aperture, the shank being adapted to be located in the aperture of the object for locating the article in two directions with respect to said object; forming a shoulder at an angle with respect to said shank to provide a surface complementary to that of the surface around the aperture of said object, said shoulder being adapted to locate the article in a third direction with respect to said object; pulling, during rotation, a plurality of circumferentially spaced welding projections out from the body of the article and forwardly from said shoulder adjacent its periphery to cause said projections to extend generally in the same direction as the shank, and thereby simultaneously forming behind each projection a cavity having a volume corresponding to the volume of the projection, the pulling forward of each projection causing its rear wall and sides to be separated from the body of the article.

References Cited in the file of this patent

UNITED STATES PATENTS

| | | |
|---|---|---|
| 739,501 | Meyers | Sept. 22, 1903 |
| 1,116,005 | Babson | Nov. 3, 1914 |
| 1,249,532 | Smith et al. | Dec. 11, 1917 |
| 1,369,322 | Caldwell | Feb. 22, 1921 |
| 1,440,802 | Smith | Jan. 2, 1923 |
| 1,600,632 | Hartsoe | Sept. 21, 1926 |
| 1,721,283 | Ruth | July 16, 1929 |
| 1,930,589 | Drissner | Oct. 17, 1933 |
| 2,325,012 | Miller | July 20, 1943 |
| 2,401,834 | Liddicoat | June 11, 1946 |
| 2,443,815 | Dahl | June 22, 1948 |

FOREIGN PATENTS

| | | |
|---|---|---|
| 515,723 | Germany | Jan. 10, 1931 |

OTHER REFERENCES

The Welding Journal, December 1946, pp. 1189–1192.